United States Patent [19]

Terry et al.

[11] Patent Number: 5,158,687
[45] Date of Patent: Oct. 27, 1992

[54] METHODS OF REMOVING UNDESIRED IONS FROM AQUEOUS SOLUTIONS

[75] Inventors: Charles L. Terry, Nashotah; Leo F. Bohanon; Scott S. Roth, both of Oconomowoc, all of Wis.

[73] Assignee: Hydrite Chemical Co., Brookfield, Wis.

[21] Appl. No.: 728,490

[22] Filed: Jul. 11, 1991

[51] Int. Cl.$^5$ ............................................. C02F 1/62
[52] U.S. Cl. ........................... 210/720; 210/721; 210/724; 210/726; 210/756; 210/757; 210/904; 210/913; 204/DIG. 13; 423/55; 423/365
[58] Field of Search ............... 210/719, 720, 723-728, 210/756, 757, 904, 912, 913, 721; 423/55, 57, 58, 365; 204/DIG. 13

[56] References Cited

U.S. PATENT DOCUMENTS

| | | | |
|---|---|---|---|
| 3,740,331 | 6/1973 | Anderson et al. | 210/53 |
| 3,826,741 | 7/1974 | Nakamura | 210/719 |
| 3,835,042 | 9/1974 | Lalancette et al. | 210/28 |
| 3,843,769 | 10/1974 | Patridge et al. | 210/913 |
| 4,086,150 | 4/1978 | Kindl et al. | 204/95 |
| 4,259,297 | 3/1981 | Kaczur et al. | 423/55 |
| 4,364,835 | 12/1983 | Cheh | 210/757 |
| 4,537,686 | 8/1985 | Borbely et al. | 210/904 |

FOREIGN PATENT DOCUMENTS

| | | | |
|---|---|---|---|
| 55-49191 | 4/1980 | Japan | 210/904 |
| 58-34084 | 2/1983 | Japan | 210/756 |
| 60-216885 | 10/1985 | Japan | 210/720 |

Primary Examiner—Peter Hruskoci
Attorney, Agent, or Firm—Quarles & Brady

[57] ABSTRACT

A method of removing undesired ions, such as chlorine, hypochlorite, chromium, cyanide and heavy metal ions, from an aqueous preparation containing one or more of said ions consists of adding to the aqueous preparation an effective amount of magnesium bisulfite to inactivate the undesired ions and then adjusting the pH of the mixture to an appropriate pH. Compositions containing magnesium bisulfite and divalent and trivalent ions are disclosed.

5 Claims, No Drawings

METHODS OF REMOVING UNDESIRED IONS FROM AQUEOUS SOLUTIONS

FIELD OF THE INVENTION

The present invention relates to methods of removing undesired ions from aqueous solutions. More particularly, the invention relates to methods of removing chlorine, hypochlorite, chromium, cyanide and heavy metal ions from aqueous solutions.

BACKGROUND OF THE INVENTION

Industries and municipal governments must comply with the environmental protection laws of both the federal government and the states in which they are located. In general, these laws require that any effluent or waste water must be free of unacceptable levels of undesired ions and substances.

The electroplating industry, for example, must remove chloride, chromium, cyanide and heavy metal ions such as nickel ions from waste water before it can be disposed. It is known that hexavalent chromium ions can be reduced to trivalent chromium ions and precipitated by the use of inorganic sulfur containing reducing compounds. It is also known that metal ions, such as nickel ions, can be removed from plating solutions with chelating agents. Methods also are known for dechlorinating plating solutions and reducing cyanide ions to cyanate ions which can be readily removed from the waste water.

At the present time, in order to remove a combination of undesired ions, such as chromium and/or chlorine and/or hypochlorite and/or cyanide and/or metal ions, it is necessary to analyze the ion content of the waste water to determine what agents to use or to treat the waste water stepwise with a series of different agents to insure the removal of all of the undesired ions that might be present.

There is obviously a need for a simple, inexpensive method of removing one or more undesired ions from an aqueous preparation. There also is a need for compositions for use in such a method.

BRIEF SUMMARY OF THE INVENTION

It is an object of the present invention to disclose simple, inexpensive methods of removing one or more undesired ions from an aqueous preparation.

It is a further object to disclose simple, inexpensive methods for removing chlorine, hypochlorite, chromium, cyanide, heavy metal ions and mixtures thereof from an aqueous preparation.

It is also an object of the invention to disclose novel compositions which can be used in the methods of the present invention.

The present invention broadly comprises removing by inactivation undesirable ions in an aqueous preparation by adding to the preparation an effective amount of magnesium bisulfite to inactivate and/or precipitate the ions when the appropriate pH adjustments are made.

The method of the present invention for removing undesired ions, such as chromium and heavy metal ions, from an aqueous preparation containing one or more of those ions comprise adjusting the pH of the aqueous preparation to an acidic pH, adding an effective amount of magnesium bisulfite to chemically reduce the valence of the undesired ions, agitating the preparation, adjusting the pH to an alkaline pH to precipitate the undesired ions and then separating the precipitate from the aqueous preparation.

When the aqueous preparation contains as one of the undesired ions hexavalent chromium ions, it is preferred to first adjust the pH of the aqueous preparation to about 2, add a solution containing the magnesium bisulfite in an effective amount, agitate the mixture until the solution changes color from amber to pale green, adjust the pH of the mixture to about 9.5 to cause a precipitation of the trivalent chromate ions and decant the supernatant liquid.

If the aqueous preparation contains chlorine, hypochlorite, and/or cyanide ions, care must be exercised to maintain the pH above 7.5 at all times to insure that deadly chlorine gas or hydrogen cyanide gas is not liberated. Therefore, when the aqueous preparation may contain chlorine, hypochlorite, and/or cyanide, the magnesium bisulfite is added first to eliminate any residual chlorine and then adjusted to a pH of 7.5 or above.

The methods and compositions of the present invention are both less expensive and more effective in removing hexavalent chromate ions than the conventional methods employing sodium bisulfite. For example, the method of the present invention results in a more complete precipitation of the extremely small "pin floc" particles.

When the aqueous preparation, in addition to the chromium ions, also contains nickel or a similar plating metal, the process does not have to be changed because the magnesium bisulfite not only reduces the hexavalent chromium ions, but it also precipitates the metal ions.

When the method of the present invention is used to dechlorinate an aqueous preparation, such as a platers effluent which contains excess sodium hypochlorite which has been added to oxidize cyanide, the magnesium bisulfite both reduces the residual cyanide to cyanate and aids in its precipitation, as well as reducing the chlorine ions by converting them to a soluble chloride salt.

The method of the present invention is not only effective in removing all of the aforementioned ions, it also is inexpensive, fast and results in the formation of non-toxic, non-regulated products.

The compositions of the present invention are aqueous solutions containing magnesium bisulfite in a concentration of about 5 to 35 percent by weight and/or the magnesium bisulfite and a divalent or trivalent cation, such as iron ions, in a concentration of 0 to 500 parts per million. The iron ions appear to facilitate and assist the precipitation of the undesired ions.

DESCRIPTION OF THE PREFERRED EMBODIMENT

In one preferred embodiment of the method of the present invention the pH of an aqueous preparation containing chromium and/or heavy metal ions is adjusted to an acidic pH of about 2 with an inorganic acid, such as sulfuric acid, hydrochloric acid, phosphoric acid and/or nitric acid. To the aqueous preparation then is added a solution containing magnesium bisulfite in a concentration of about 5 to about 35% by weight and about 0 to 500 ppm of a suitable divalent or trivalent ion, such as ferrous or ferric ions, in an amount which is effective to react with and precipitate all the undesired ions in the aqueous preparation. The resulting mixture is agitated and the reactants allowed to react. Then the pH of the mixture is adjusted to about 9.5 and the precipitate which forms is separated from the liquid phase by decanting or other conventional techniques.

In addition to chromium ions, the method can also be used to remove undesired heavy metal ions, including but not limited to nickel, cadmium, copper, gold, lead, platinum, silver, molybdenum, tin and zinc.

When the aqueous preparation contains chlorine, hypochlorite and/or cyanide ions the magnesium bisulfite is added and the pH is maintained at 7.5 or above to insure that chlorine or hydrogen cyanide gas is not liberated.

The magnesium bisulfite which is used in the method of the present invention may be readily prepared by the reaction of sulfurous acid and a magnesium alkali source such as magnesium oxide, magnesium hydroxide or magnesium chloride. The reaction is carried out in an aqueous state in a system that allows cooling of the reaction and retards the omission of sulfur dioxide.

The practice of the invention is further illustrated by the following examples:

EXAMPLE 1

To a 100 mL solution containing 1000 parts per million (ppm) of hexavalent chrome is added 1.0 mL of sulfuric acid 66 deg. to achieve a pH of 2.0. An aqueous solution of magnesium bisulfite is added so that the anhydrous concentration of $Mg(HSO_3)_2$ is 1500 ppm and 100 ppm iron. After agitation for five minutes, the solution changes color from amber to pale green.

Sodium hydroxide in a concentration of 1200 ppm anhydrous is added to the solution to raise the pH to 9.5, causing an immediate precipitate to form. The supernatant liquid is decanted and the chrome level checked. The remaining trivalent chrome level left in the supernatant is 0.5 ppm.

EXAMPLE 2

To a 1 liter sample of an aqueous solution containing 50 ppm of available chlorine having a pH above 7.5 is added 0.2 milliliters of a 25% solution of magnesium bisulfite with agitation. The residual chlorine is then titrated with an iodometric titration yielding a residual level of zero.

EXAMPLE 3

A 300 gram sample of a plating waste stream is analyzed and found to contain 1,000 parts per million of nickel and 1,000 parts per million of hexavalent chrome. The pH is first adjusted to 2.0 with sulfuric acid, and then 5 grams of a 25% solution of magnesium bisulfite, added with agitation. The pH is then adjusted to 9.0 with magnesium hydroxide. The resulting precipitant is filtered and filtrate is analyzed and found to contain 0.44 ppm of nickel and 0.47 ppm of chrome.

EXAMPLE 4

A sample of an alkaline plating waste is collected, analyzed and found to contain 10,000 ppm of cyanide as CN. Chlorine gas is added to the solution until the pH is lowered to 9.0. Sulfuric acid is then added carefully to lower the pH to 7.5. Fifteen grams of a 30% solution of magnesium bisulfite is added to remove any residual or unreacted chlorine. The pH is raised back to 9.5 with sodium hydroxide and an additional 5 grams of magnesium bisulfite is added to treat any unreacted cyanide. Additional sodium hydroxide is added to readjust the pH to 9.5 and a precipitant forms. The filtrate is separated and analyzed and found to have a residual cyanide level of 0.75 grams per liter.

EXAMPLE 5

A sample of a plating waste is analyzed and found to contain 980 ppm chromium, 937 ppm nickel and 9,872 ppm of cyanide. Sodium hypochlorite is added stoichiometrically to oxidize the cyanide to cyanate. Sulfuric acid is added to lower the pH to about 7.5 and an excess of 30% magnesium bisulfite is added with agitation for 45 minutes. The pH is then readjusted to about 9.5 with magnesium hydroxide and a precipitant forms. The filtrate is separated, tested and found to contain the following residuals: Chromium 0.53 ppm, nickel 0.47 ppm and cyanide 0.82 grams per liter.

Although a simple aqueous solution of magnesium bisulfite can be used in the methods of the present invention, the preferred composition is an aqueous solution which contains 25 to 35% by weight of magnesium bisulfite and about 100 ppm of iron ions.

It will be apparent to the those skilled in the art that a number of modifications and changes can be made without departing from the spirit and scope of the present invention. For example, an addition to using aqueous preparations containing the magnesium bisulfite and/or the additional divalent or trivalent cations in solution, dry preparations containing such compounds can be employed which can be readily dissolved in water prior to addition to the aqueous preparation or simply added to the aqueous preparation. As a result, it is intended that the invention not be limited by the description but only by the claims that follow.

We claim:

1. In the method of removing hexavalent chromium ions from an aqueous solution with an inorganic sulfur containing compound, the improvement which comprises adjusting the pH of the aqueous solution containing the hexavalent chromium ions to about 2, adding an effective amount of magnesium bisulfite to the solution to reduce the hexavalent chromate ions to trivalent chromium ions, agitating the mixture until the hexavalent chromium ions have been reduced to trivalent chromium ions, raising the pH to about 9.5 to precipitate the trivalent chromium ions as a pin floc and then separating the precipitated solids from the aqueous solution.

2. The method of claim 1 in which the magnesium bisulfite is added as an aqueous solution containing about 5% to about 35% by weight of magnesium bisulfite and 0 to 500 ppm of a divalent or trivalent cation.

3. The method of claim 2 in which the cation is a ferrous or ferric ion.

4. In the method of removing cyanide ions form an aqueous solution which includes treating the cyanide ions with hypochlorite, the improvement which comprises adding to the aqueous solution an effective amount of magnesium bisulfite to convert any residual chlorine to a water soluble chloride salt, adjusting the pH to about 7.5, adding additional magnesium bisulfite to reduce the residual cyanide to cyanate, adjusting the pH to about 9.5 to precipitate the cyanate ions and then separating the precipitate from the aqueous solution.

5. The method of claim 4 in which the magnesium bisulfite is added as an aqueous solution containing about 5% to about 35% of magnesium bisulfite by weight.

* * * * *

UNITED STATES PATENT AND TRADEMARK OFFICE
CERTIFICATE OF CORRECTION

PATENT NO. : 5,158,687

DATED : October 27, 1992

INVENTOR(S) : Terry et al.

It is certified that error appears in the above-identified patent and that said Letters Patent is hereby corrected as shown below:

Column 1, line 20     "chloride" should read --chlorine--

Column 2, line 10     "chromate" should read --chromium--

Column 4, line 40     "chromate" should read --chromium--

Signed and Sealed this

Seventh Day of December, 1993

*Attest:*

BRUCE LEHMAN

*Attesting Officer*     Commissioner of Patents and Trademarks